United States Patent
Boyaci Mutlu et al.

(10) Patent No.: US 11,930,286 B2
(45) Date of Patent: Mar. 12, 2024

(54) METHOD FOR OPTICAL PATH MAINTENANCE NEED DECISION FOR FIX FOCUS SYSTEMS DUE TO ELECTRO-OPTICAL PERFORMANCE DEGRADATION IN TIME

(71) Applicant: ASELSAN ELEKTRONIK SANAYI VE TICARET ANONIM SIRKETI, Ankara (TR)

(72) Inventors: Birce Gulec Boyaci Mutlu, Ankara (TR); Tolga Aksoy, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 18/249,071

(22) PCT Filed: May 17, 2022

(86) PCT No.: PCT/TR2022/050439
§ 371 (c)(1),
(2) Date: Apr. 14, 2023

(87) PCT Pub. No.: WO2022/265599
PCT Pub. Date: Dec. 22, 2022

(65) Prior Publication Data
US 2023/0345145 A1    Oct. 26, 2023

(30) Foreign Application Priority Data
Jun. 17, 2021  (TR) ............... 2021/009906

(51) Int. Cl.
H04N 25/68    (2023.01)
G06V 10/762   (2022.01)

(52) U.S. Cl.
CPC .......... *H04N 25/68* (2023.01); *G06V 10/762* (2022.01)

(58) Field of Classification Search
CPC ..................... H04N 25/68; G06V 10/762
See application file for complete search history.

(56) References Cited

U.S. PATENT DOCUMENTS

2012/0239330 A1   9/2012 Tremblay et al.
2020/0099825 A1*  3/2020 Marteney ............ H04N 25/673

OTHER PUBLICATIONS

M. Estribeau, et al., Fast MTF measurement of CMOS imagers at the chip level using ISO 12233 slanted-edge methodology, Proceedings of SPIE—Sensors, Systems, and Next-Generation Satellites VIII, 2004, vol. 5570.

(Continued)

*Primary Examiner* — Twyler L Haskins
*Assistant Examiner* — Fayez A Bhuiyan
(74) *Attorney, Agent, or Firm* — Bayramoglu Law Offices LLC

(57) ABSTRACT

A method that determines optical path maintenance need before any critical failure in operation of the system is provided. In order to indicate the maintenance need due to the defocusing, the pixel-wise offset value differences between 2 point NUC and 1 point NUC are examined. When the width of this pixel-wise offset difference histogram is greater than predefined threshold, maintenance need is raised. The change in detector characteristics and the need for 2 point NUC/BPR update are proposed to be determined after 1 point NUC by controlling the total number of the bad pixels and bad pixel clusters.

2 Claims, 2 Drawing Sheets

(56) References Cited

OTHER PUBLICATIONS

Egbert Buhr, et al., Simple method tor modulation transfer function determination of digital imaging detectors from edge images, Proceedings of SPIE, 2003, pp. 877-884, vol. 5030.

Tiecheng Li, et al., Comparison of different analytical edge spread function models tor MTF calculation using curve-fitting, Proc. of SPIE, pp. 1-8, vol. 7498.

Hang Li, et al., Measurement of the Modulation Transfer Function of Infrared Imaging System by Modified Slant Edge Method, Journal of the Optical Society of Korea, 2016, pp. 381-388, vol. 20 No. 3.

T. Han, et al., Detection and Correction of Abnormal Pixels in Hyperion Images, IEEE International Geoscience and Remote Sensing Symposium, 2002, pp. 1327-1330, vol. 3.

R.A. Leathers, et al., Scene-based nonuniformity correction and bad-pixel identification for hyperspectral VNIR/SWIR sensors, IEEE International Symposium on Geoscience and Remote Sensing, 2006, pp. 2373-2376.

Jim S. Jimmy Li, et al., Adaptive Order-Statistics Multi-Shell Filtering for Bad Pixel Correction within CFA Demosaicking, IEEE, 2009, pp. 1-6.

Vittal Premachandran, et al., Measuring the Effectiveness of Bad Pixel Detection Algorithms using the ROC Curve, IEEE Transactions on Consumer Electronics, 2010, pp. 2511-2519, vol. 56 No. 4.

Dean Scribner, et al., Adaptive nonuniformity correction tor IR focal-plane arrays using neural networks, Infrared Sensors: Detectors, Electronics, and Signal Processing, 1991, pp. 100-109, vol. 1541.

Azwitamisi E Mudau, et al., Non-Uniformity Correction and Bad Pixel Replacement on LWIR and MWIR Images, Electronics, communications and photonics conference (SIECPC), 2011.

Robert Richwine, et al., A Full-Spectrum, 3-D Noise-Based Infrared Imaging Sensor Model, Proc. of SPIE, 2006, vol. 6297.

* cited by examiner

METHOD FOR OPTICAL PATH MAINTENANCE NEED DECISION FOR FIX FOCUS SYSTEMS DUE TO ELECTRO-OPTICAL PERFORMANCE DEGRADATION IN TIME

CROSS REFERENCE TO THE RELATED APPLICATIONS

This application is the national phase entry of International Application No. PCT/TR2022/050439, filed on May 17, 2022, which is based upon and claims priority to Turkish Patent Application No. 2021/009906, filed on Jun. 17, 2021, the entire contents of which are incorporated herein by reference.

TECHNICAL FIELD

The present invention is a method to determine optical path maintenance need in IR imagers based on controlling defocusing due to focus shift and 2 point non-uniformity correction (NUC)/bad pixel replacement (BPR) update need due to the change in detector characteristics.

BACKGROUND

Reliability of the image obtained by an electro-optical system has significant importance to get full system performance. In order to reach this reliability, the optical path is demanded to have a good focus and high quality image correction. However, errors encountered in the optical path may significantly degrade the system performance. The optical path could be defined as the path that the infrared light follows in the system including the optics and the detector. One of these errors is defocusing due to focus shift which directly causes attenuation in the target signal. Focus shift may occur because of environmental conditions. Since a specific set-up with a known target (i.e. sine, sinusoidal Siemens star, point, line or edge target) is required to get modulation transfer function (MTF), realizing focus shift through traditional MTF measurement methods is not feasible at the operational field for fix focus systems. Another error is the change in the detector characteristics due to detector aging. Although systems are brought into usage after 2 point NUC/BPR applied at the factory level, offset and bad pixel tables are needed to be updated to compensate the changes in Residual Fixed Pattern Noise (RFPN) over time. For this purpose, 1 point NUC/BPR is performed at each power up. A noticeable change in the detector characteristics could cause excessive increase in the total number of bad pixels detected during 1 point NUC/BPR. In that case, it is suspicious that all bad pixels are detected and replaced. Bad pixel clusters could be observed as another effect of change in detector characteristics.

The application numbered US2012239330A1 states a method for radiometric calibration of an infrared detector, the infrared detector measuring a radiance received from a scene under observation, the method including: providing calculated calibration coefficients; acquiring a scene count of the radiance detected from the scene; calculating a scene flux from the scene count using the calculated calibration coefficients; determining and applying a gain-offset correction using the calculated calibration coefficients to obtain a uniform scene flux. However, examining the width of pixel-wise offset difference to detect defocusing and evaluating the change in the detector characteristics and consequently 2 point NUC update need regarding the total number of bad pixels and bad pixel clusters are not mentioned in this application.

SUMMARY

The invention presents a unified method that determines optical path maintenance need before any critical failure in operation of the system. The previously defined optical path errors are categorized as defocusing due to focus shift and 2 point NUC/BPR update need due to the change in the detector characteristics. In order to indicate the maintenance need due to the defocusing, the pixel-wise offset value differences between 2 point NUC and 1 point NUC are examined. When the width of this pixel-wise offset difference histogram is greater than predefined threshold, maintenance need is raised. The deviation in pixel-wise offset differences implies the scale of deterioration in the focus of the system. To catch the 2 point NUC/BPR update need due to change in detector characteristics, firstly the number of bad pixels is checked after 1 point NUC applied. Excessive increase in the total number of bad pixels gives a sign for the maintenance need. Then, the number and size of the bad pixel clusters are checked. Increase in the number and size of the bad pixel clusters is a consequence of change in pixel characteristics. Since this change could affect system performance severely, maintenance need arises again. Experimental results show that the reliability of the IR image has a critical impact on the system performance. The proposed method is useful to detect the maintenance need in case of optical path errors each of which degrade the image reliability and easy to implement since it does not require external devices/setups.

DETAILED DESCRIPTION OF THE EMBODIMENTS

Figure 1:
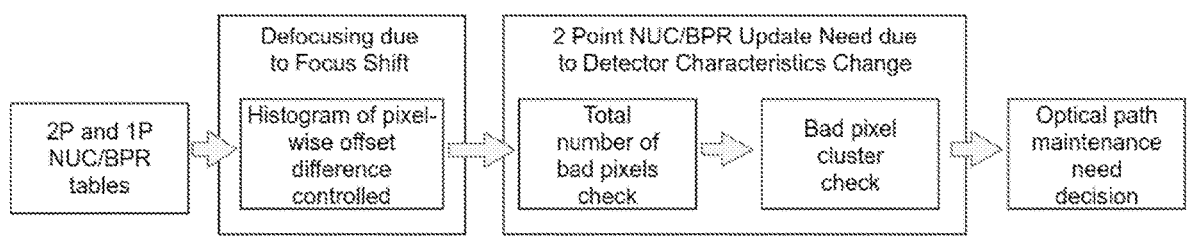
FIG. 1 shows overall flowchart of the maintenance need decision path.

The optical path errors examined in the present invention are defocusing due to focus shift and 2 point NUC/BPR table update need due to detector characteristics change. Overall flowchart of the maintenance need decision path is shown in FIG. 1.

For electro-optical systems with fix focus, the system focus level has great significance to prevent blurring and contrast attenuation. Although the system focus adjustment is made at the factory, focus shift may occur because of vibration, thermal effects and mechanical fatigues.

Modulation Transfer Function (MTF) is a well-known measure to quantify the image quality in imaging systems. It gives the signal transfer characteristics as a function of spatial frequency. On the MTF curve, 0 means complete loss of information whereas 1 means no loss. Therefore, it is desired to have an MTF curve falling to zero at higher spatial frequencies. In case of focus shift, MTF curve falls rapidly.

Various techniques such as sine wave target method, point method, slit method and slanted-edge method are proposed to determine MTF. Estribeau et al. [1] stated that slit and sine wave target methods need long measurement time imposing practical limitations. In addition, even though slit method is considered as being superior to the edge method in order to estimate MTF at high spatial frequencies [2], it requires precise target manufacturing and alignment; the width of the slit must be narrow compared to the pixel size [3-4]. In this invention, slanted-edge method is used to estimate MTF. Limitations of this method are introduced by Li et al. [4]. To determine MTF in slant edge method, Edge Spread Function (ESF) is constructed by scanning the image along a line perpendicular to the slanted edge first. Then, ESF is differentiated to get Line Spread Function (LSF) as shown in Equation 1.

$$LSF(x) = \frac{d}{d_X} ESF(x) \qquad (1)$$

Finally, Fourier Transform of the LSF is calculated to estimate MTF as shown in Eq. 2.

$$MTF(f_x) = |F[LSF(x)]| \qquad (2)$$

Figure 2:
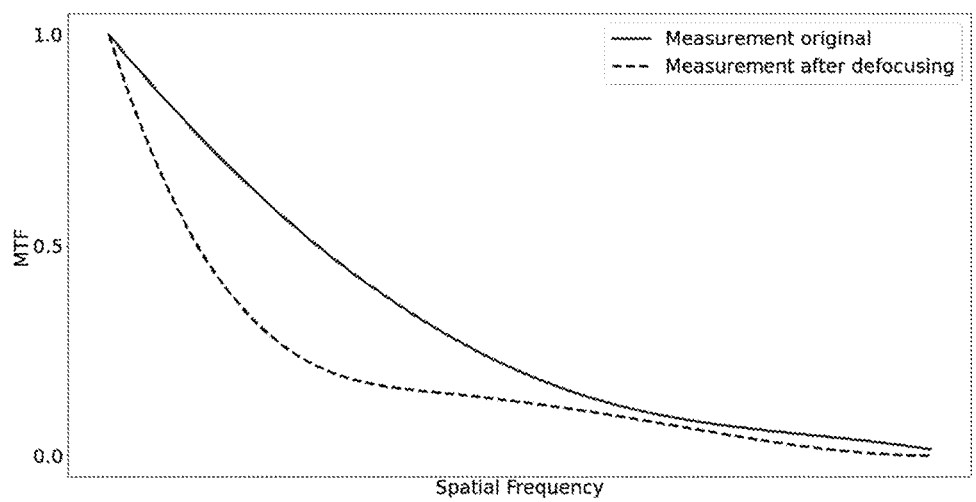
FIG. 2 shows MTF degradation for a system after one year usage.

In FIG. 2, MTF degradation has been shown for a system after one year usage. It is seen that the MTF degradation is so severe. To get full performance, it is necessary to realize the defocusing and conduct maintenance activities. However, MTF estimation requires a specific set-up with a specific target; it may not be always possible to determine system MTF in the field.

To detect defocusing, NUC offset values have been studied for 9 systems, two of which have MTF degradation after one year. For each system, the pixel-wise offset value differences between 2 point NUC and 1 point NUC have been examined. The results of the pixel-wise offset difference histogram have been listed in Table 1. It is seen that the offset values updated in 1 point NUC dramatically differ from the offset values of 2 point NUC in case of defocusing.

TABLE 2

Width of the pixel-wise offset difference histogram

| | |
|---|---|
| System-1 with MTF degradation | 412 |
| System-2 with MTF degradation | 600 |
| Median of 9 systems | 21 |
| Maximum of 7 systems (excluding two MTF degraded systems) | 67 |

Therefore, it is proposed that the defocusing in fix focus systems is found out by reviewing the width of pixel-wise offset difference histogram at each power up. Note that the threshold to be implemented is strictly application dependent.

In addition to optical maintenance need decision, the width of the pixel-wise offset difference histogram may be stored and used as an early warning. At each power up, the width of the pixel-wise offset difference histogram is calculated and compared to its previous values to examine whether the change in these values are approaching to the defocusing threshold or not. If the tendency to approach to the defocusing threshold is detected, then, it is considered as an early warning.

BPR is another important factor to be considered regarding performance of the electro-optical system. In order to detect the bad pixels, different types of methods [5-8] could be used. After detection of the bad pixels, the signal acquired from a bad pixel/cluster is replaced with the neighbouring pixels.

For the system mentioned in the present invention, 2 point NUC/BPR is performed at the factory and the related tables are saved to the flash memory. The corrected response could be obtained by using these tables as shown in Eq. 3 where $G_{ij}$ is the gain and $O_{ij}$ is the offset. During 1 point NUC/BPR process, the gains from 2 point NUC are used and only the offset values are updated to correct the image [9], which can be expressed as Eq. 4. BPR is also performed again as a last stage of 1 point NUC/BPR process. By this way, the bad pixels arose after the factory level calibration could be easily detected.

$$V'_{ij} = G_{ij} * V_{ij} + O_{ij} \qquad (3)$$

$$V'_{ij} = G_{ij} * V_{ij} + O'_{ij} \qquad (4)$$

However, since the detector pixel characteristics may significantly change in time, it may not be sufficient to correct the pixel by only updating the NUC offsets at 1 point NUC. In this case, 2 point NUC/BPR table update (both NUC gain and NUC offset) is mandatory as a maintenance activity.

A bad pixel should be successfully replaced and bad pixel clusters should be treated properly in order to get full performance from the system.

Figure 3A:
FIGS. 3A and 3B show bad pixel maps after 2 point NUC at the factory and 1 point NUC at the field respectively.
Figure 3B:
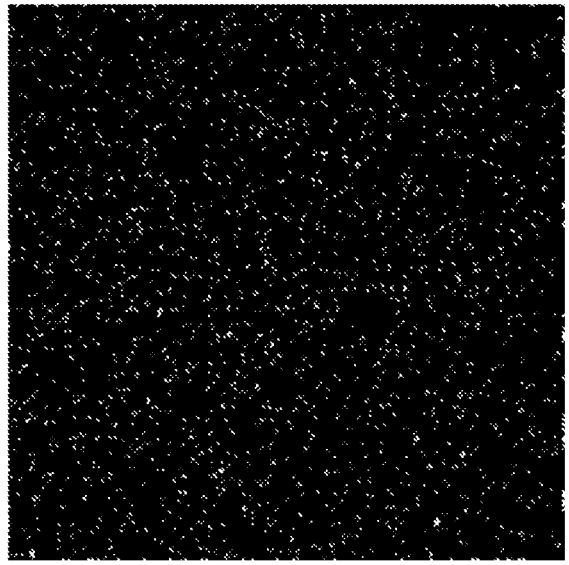

Although the system has been delivered to the field appropriately, the bad pixels on the detector may emerge in time because of cool down cycling or storage conditions etc. 1 point NUC/BPR process is expected to eliminate those new emergent bad pixels and it does to a certain level. However, detecting an excessive number of bad pixels during 1 point NUC/BPR means that the detector characteristics has changed significantly and the 2 point NUC/BPR tables saved in the flash memory are now obsolete. As the obsolete 2 point NUC gain is not optimized for the new pixel characteristic anymore, 1 point NUC offset for that pixel differs from the other neighbouring pixels' remarkably to compensate the obsolete gain correction. This is the main reason of the excessive bad pixel number. Remind that the final image would use 2 point NUC gains and 1 point NUC offsets [9]. It is important to note that during 1 point NUC, the updated NUC offset values are calculated using 2 point NUC gains. Therefore, if 2 point NUC/BPR tables are obsolete, it is not possible to obtain reliable images. In FIGS. 3A and 3B, bad pixel maps for both 2 point NUC/BPR and 1 point NUC/BPR have been illustrated in white for a system delivered to the field. As can be seen, the 2 point bad pixel map is acceptable. On the other hand, after field operation for a while, 1 point bad pixel map has shown excessive number of bad pixels.

In addition to optical maintenance need decision, total number of bad pixels may be stored and used as an early warning. At each power up, total number of bad pixels is calculated after 1 point NUC and compared to its previous values to examine whether the change in these values are approaching to the total number of bad pixel threshold or not. If the tendency to approach to that threshold is detected, then, it is considered as an early warning.

Figure 4A:
FIGS. 4A and 4B show bad pixel maps using obsolete 2 point NUC/BPR tables before 1 point NUC and after 2 point NUC update.
Figure 4B:
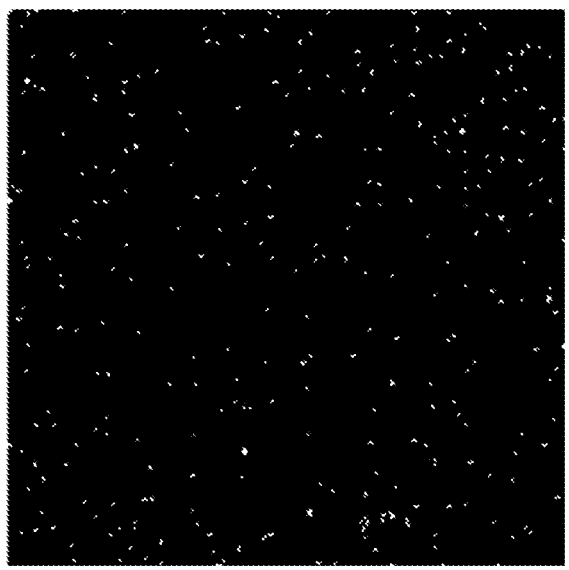

Bad pixel clusters are also needed to be controlled since they can have destructive effects on the target signal. Signal obtained from that cluster (including some part of the target signal) would be replaced with the neighbouring pixels (only including the background signal) by BPR algorithm. A total of 75 test conducted with 7 systems two of which have significant pixel clusters have been analyzed from this point of view. Pixel clusters are seen at the bottom right and top left corners in FIG. 4A. After 2 point NUC/BPR update maintenance, they are handled properly as in FIG. 4B.

In addition to optical maintenance need decision, bad pixel clusters number and size may be stored and used as an early warning. At each power up, bad pixel cluster number and size are calculated after 1 point NUC and compared to their previous values to examine whether the change in these values are approaching to the predefined threshold or not. If the tendency to approach to these thresholds is detected, then, it is considered as an early warning.

As a result, the change in detector characteristics and the need for 2 point NUC/BPR update are proposed to be determined after 1 point NUC by controlling the total number of the bad pixels and bad pixel clusters. The system operation suffers from two different cluster types: one large cluster or many small clusters (as in FIG. 4A). Therefore, the control should consider both cluster types.

REFERENCES

[1] Estribeau, M. and Magnan, P., "Fast mtf measurement of cmos imagers at the chip level using iso 12233 slanted-edge methodology," in [*SPIE Remote Sensing*], (2004).

[2] Buhr, E., Günther-Kohfahl, S., and Neitzel, U., "Simple method for modulation transfer function determination of digital imaging detectors from edge images," in [*SPIE Medical Imaging*], (2003).

[3] Li, T. and Feng, H., "Comparison of different analytical edge spread function models for MTF calculation using curve-fitting," in [*MIPPR 2009: Remote Sensing and GIS Data Processing and Other Applications*], Zhang, F. and Zhang, F., eds.,7498, 395-402, International Society for Optics and Photonics, SPIE (2009).

[4] Li, H., Yan, C., and Shao, J., "Measurement of the modulation transfer function of infrared imaging system by modified slant edge method," *J. Opt. Soc. Korea* 20, 381-388 (June 2016).

[5] Han, T., Goodenough, D. G., Dyk, A., and Love, J., "Detection and correction of abnormal pixels in hyperion images," in [*IEEE International Geoscience and Remote Sensing Symposium*], 3, 1327-1330 vol. 3 (2002).

[6] Leathers, R. and Downes, T., "Scene-based nonuniformity correction and bad-pixel identification for hyperspectral vnir/swir sensors," in [*2006 IEEE International Symposium on Geoscience and Remote Sensing*], 2373-2376 (2006).

[7] Li, J. S. J. and Randhawa, S., "Adaptive order-statistics multi-shell filtering for bad pixel correction within cfa demosaicking," in [*TENCON2009—2009IEEE Region 10 Conference*], 1-6 (2009).

[8] Premachandran, V. and Kakarala, R., "Measuring the effectiveness of bad pixel detection algorithms using the roc curve," *IEEE Transactions on Consumer Electronics* 56(4), 2511-2519 (2010).

[9] Scribner, D. A., Sarkady, K. A., Kruer, M. R., Caulfield, J. T., Hunt, J. D., and Herman, C., "Adaptive nonuniformity correction for IR focal-plane arrays using neural networks," in [*Infrared Sensors: Detectors, Electronics, and Signal Processing*], Jayadev, T. S. J., ed., 1541, 100-109, International Society for Optics and Photonics, SPIE (1991).

What is claimed is:

1. A method to determine an optical path maintenance need before any critical failure in an operation of an electro-optical system with a fix focus, comprising:
    examining differences between pixel-wise offset values of one or more pixels in a 2 point Non-Uniformity Correction (NUC) and pixel-wise offset values of the same one or more pixels in a 1 point NUC to detect defocusing,
    checking a number of bad pixels and bad pixel clusters after the 1 point NUC is applied to identify a 2 point NUC table update need and a Bad Pixel Replacement (BPR) table update need due to a change in detector characteristics, and
    detecting a maintenance need if a width of a pixel-wise offset difference histogram is greater than a predefined threshold or the number of the bad pixels and the number and a size of the bad pixel clusters increase.

2. The method according to claim 1, comprising a detection of a tendency to approach to predefined thresholds for defocusing, a first threshold of the predefined thresholds comprising a total number of the bad pixels, a second threshold of the predefined thresholds comprising bad pixel clusters size, and a third threshold of the predefined thresholds comprising a number of bad pixel clusters.

* * * * *